United States Patent
Lethif et al.

(10) Patent No.: US 9,495,346 B1
(45) Date of Patent: Nov. 15, 2016

(54) CONTEXT SENSITIVE ACTIVE FIELDS IN USER INTERFACE

(71) Applicant: International Business Machines Corporation, Armonk, NY (US)

(72) Inventors: Nizar Lethif, Croton-on-Hudson, NY (US); Apurva S. Patel, Pune (IN); Prasad P. Purandare, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/055,658

(22) Filed: Feb. 29, 2016

Related U.S. Application Data

(63) Continuation of application No. 14/852,697, filed on Sep. 14, 2015.

(51) Int. Cl.
  G06F 17/24 (2006.01)
  G06Q 10/10 (2012.01)

(52) U.S. Cl.
  CPC .......... *G06F 17/243* (2013.01); *G06Q 10/10* (2013.01)

(58) Field of Classification Search
  None
  See application file for complete search history.

(56) References Cited

U.S. PATENT DOCUMENTS

| | | | |
|---|---|---|---|
| 7,418,663 B2* | 8/2008 | Pettinati | G06Q 10/10 715/739 |
| 8,255,836 B1 | 8/2012 | Gildfind | |
| 8,713,466 B2 | 4/2014 | Scott | |
| 8,739,038 B2 | 5/2014 | McCormack et al. | |
| 2007/0244976 A1* | 10/2007 | Carroll | G06Q 10/107 709/206 |
| 2008/0235594 A1 | 9/2008 | Bhumkar et al. | |
| 2011/0078622 A1 | 3/2011 | Missig et al. | |
| 2015/0193392 A1* | 7/2015 | Greenblatt | G06F 17/30876 715/205 |

OTHER PUBLICATIONS

Adams, "The End of Apps As We Know Them," Inside Intercom—Design, 2014, p. 1-17, https://blog.intercom.io/the-end-of-apps-as-we-know-them/, Accessed on Jul. 9, 2015.
Mell et al., "The NIST Definition of Cloud Computing," National Institute of Standards and Technology, Sep. 2011, p. 1-3, Special Publication 800-145.
IBM, "List of IBM Patents or Patent Applications Treated as Related (Appendix P)," May 24, 2016, p. 1-2.
Lethif et al., "Context Sensitive Active Fields in User Interface," Application and Drawings, Filed on Sep. 14, 2015, 37 pages, U.S. Appl. No. 14/852,697.

* cited by examiner

*Primary Examiner* — Jeffrey A Gaffin
*Assistant Examiner* — Nhat-Huy T Nguyen
(74) *Attorney, Agent, or Firm* — Robert C. Bunker

(57) ABSTRACT

A method for enabling at least one user interface display field to perform at least one action is provided. The method may include receiving a first user action associated with the at least one user interface display field. The method may further include activating the at least one user interface display field in response to the received first user action. Additionally, the method may include determining a context associated with the activated at least one user interface display field. The method may also include applying the determined context associated with the activated at least one user interface display. The method may further include receiving a second user action associated with the activated at least one user interface display field based on the applied determined context. The method may also include executing the received second user action.

1 Claim, 9 Drawing Sheets

CONTEXT SENSITIVE ACTIVE FIELDS IN USER INTERFACE

BACKGROUND

The present invention relates generally to the field of computing, and more specifically, to user interfaces.

Generally, user interfaces may include controls to enable users to perform different actions. For example, the user interface for an email application may include user interface controls such as "new", "reply", and "forward" to initiate emails. Furthermore, the user interface for the email application may include user interface display fields such as "recipient/sender", "subject", "date/time", "description". For example, in an email application, users may initiate and add meetings to users' calendars, whereby the user interface display fields for the calendar meeting may include the date and time, the recipients/invitees, and the subject/description of the meeting. Also, for example, in an email application, users may view received emails in a list view whereby users may view user interface display fields such as the sender, the subject, and the time and date of each email.

SUMMARY

A method for enabling at least one user interface display field to perform at least one action is provided. The method may include receiving a first user action associated with the at least one user interface display field. The method may further include activating the at least one user interface display field in response to the received first user action. Additionally, the method may include determining a context associated with the activated at least one user interface display field. The method may also include applying the determined context associated with the activated at least one user interface display. The method may further include receiving a second user action associated with the activated at least one user interface display field based on the applied determined context. The method may also include executing the received second user action.

A computer system for enabling at least one user interface display field to perform at least one action is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a first user action associated with the at least one user interface display field. The method may further include activating the at least one user interface display field in response to the received first user action. Additionally, the method may include determining a context associated with the activated at least one user interface display field. The method may also include applying the determined context associated with the activated at least one user interface display. The method may further include receiving a second user action associated with the activated at least one user interface display field based on the applied determined context. The method may also include executing the received second user action.

A computer program product for enabling at least one user interface display field to perform at least one action is provided. The computer program product may include one or more computer-readable storage devices and program instructions stored on at least one of the one or more tangible storage devices, the program instructions executable by a processor. The computer program product may include program instructions to receive a first user action associated with the at least one user interface display field. The computer program product may also include program instructions to activate the at least one user interface display field in response to the received first user action. The computer program product may further include program instructions to determine a context associated with the activated at least one user interface display field. Additionally, the computer program product may include program instructions to apply the determined context associated with the activated at least one user interface display. The computer program product may also include program instructions to receive a second user action associated with the activated at least one user interface display field based on the applied determined context. The computer program product may further include program instructions to executing the received second user action.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
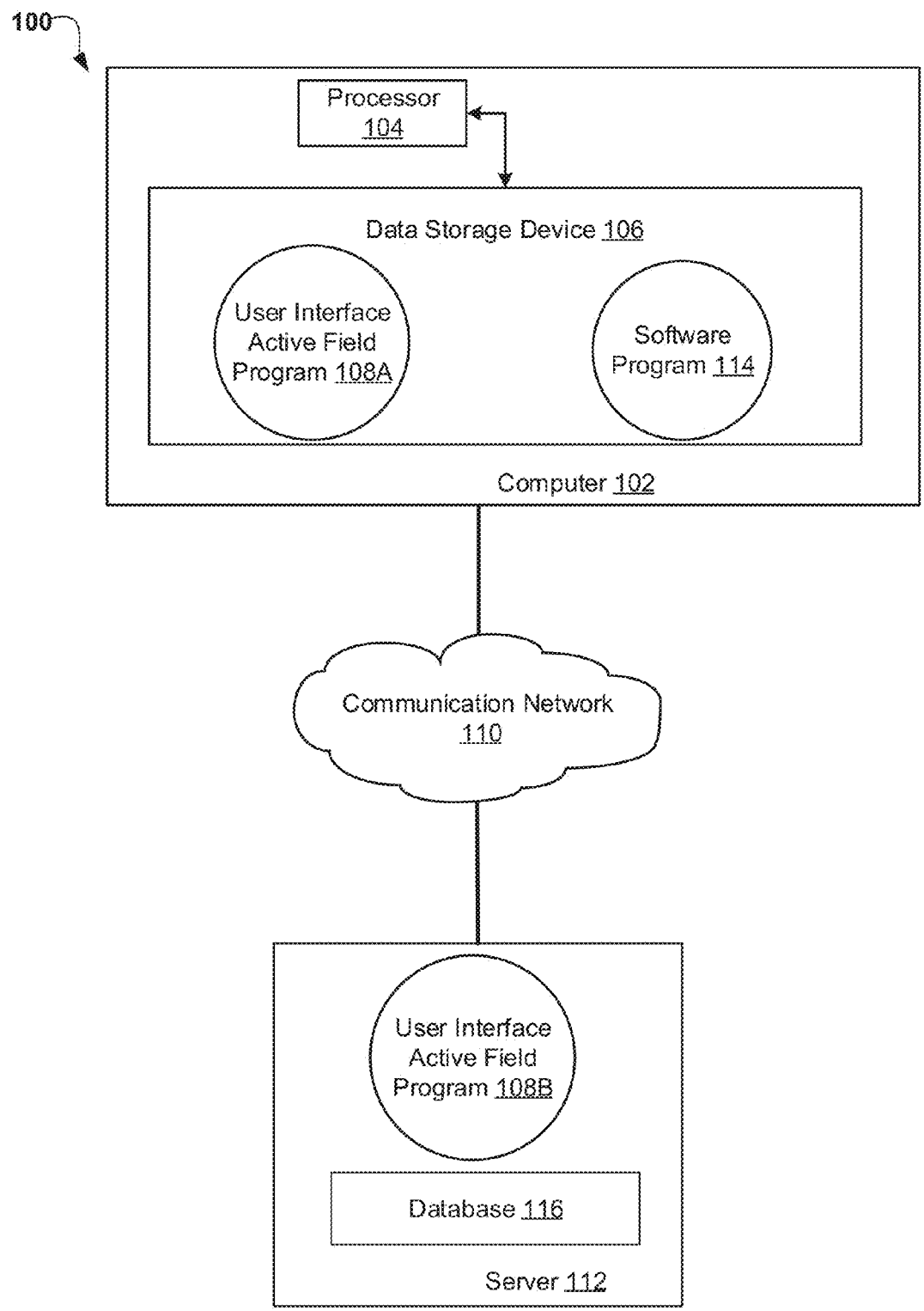
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to user interfaces. The following described exemplary embodiments provide a system, method and program product for enabling user interface display fields to perform actions based on user interaction. Therefore, the present embodiment has the capacity to improve the technical field associated with user interfaces by converting user interface display fields to active user interface display fields to enable users to perform actions. Specifically, the present embodiment may enable users to perform specific actions by hovering over user interface display fields based on the context associated with the user interface display field.

As previously described, a user interface for an email application may include user interface display fields such as "recipient/sender", "subject", "date/time", "description". For example, users may receive emails whereby users may view user interface display fields associated with the received emails such as the sender, the subject, and the time and date of each email. Typically, to perform an action such as forwarding the email to other users, the user/recipient of the email clicks on a forwarding button atop the user interface of the email application that changes the user recipient's view page from a list emails view to a message view. Therefore, to perform certain actions associated with applications such as an email, a calendar, and a "to do" list application, users may lose the view associated with a first context to a view associated with a different second context. For example, a user may view a list of meetings associated with the user's calendar in a calendar meetings view, whereby user interface display fields such as the location, date and time of the meetings are displayed. Typically, the user may edit the user interface display fields, such as the time for the meeting, by opening a specific calendar meeting in an editing view and thereby changing the context of the user's view from a calendar meetings view to the editing view. Therefore, the number of steps to complete such actions as editing the time for meetings are increased and users may lose the context of a view page to a different view page. As such, it may be advantageous, among other things, to provide a system, method and program product for enabling user interface display fields to perform actions based on user interaction with the user interface display fields. Specifically, users may be enabled to perform actions by hovering over user interface display fields based on the context associated with the user interface display field.

According to at least one implementation of the present embodiment, user actions associated with user interface display fields may be received. Then, the user interface display fields may be activated. Next, at least one context associated with the activated user interface display field may be determined. Then, the determined at least one context may be applied. Next, user actions based on the determined at least one context may be received. Thereafter, the received user actions associated with the determined at least one context may be executed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for enabling user interface display fields to perform actions based on user interaction.

According to at least one implementation, user actions associated with user interface display fields may be received. Then, based on the received user action, the user interface display fields may be activated. Next, at least one context associated with the activated user interface display field may be determined. Then, the determined at least one context may be applied. Next, user actions based on the determined at least one context may be received. Thereafter, the received user actions associated with the determined at least one context may be executed.

Referring now to FIG. 1, an exemplary networked computer environment 100 in accordance with one embodiment is depicted. The networked computer environment 100 may include a computer 102 with a processor 104 and a data storage device 106 that is enabled to run a user interface active field program 108A and a software program 114. The software program 114 may be an application program such as an internet browser and an email program. The user interface active field program 108A may communicate with the software program 114. The networked computer environment 100 may also include a server 112 that is enabled to run a user interface active field program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 7, server computer 112 may include internal components 800*a* and external components 900*a*, respectively and client computer 102 may include internal components 800*b* and external components 900*b*, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the user interface active field program 108A, 108B may interact with a database 116 that may be embedded in various storage devices, such as, but not limited to a mobile device 102, a networked server 112, or a cloud storage service.

According to the present embodiment, a program, such as a user interface active field program 108A and 108B may run on the client computer 102 or on the server computer 112 via a communications network 110. The user interface active field program 108A, 108B may enable user interface display fields to perform actions based on user interaction. Specifically, a user using a computer, such as computer 102, may run a user interface active field program 108A, 108B, that interacts with a software program 114, such as an email application, to perform actions using user interface display fields based on the context associated with the user interface display fields.

Figure 2:
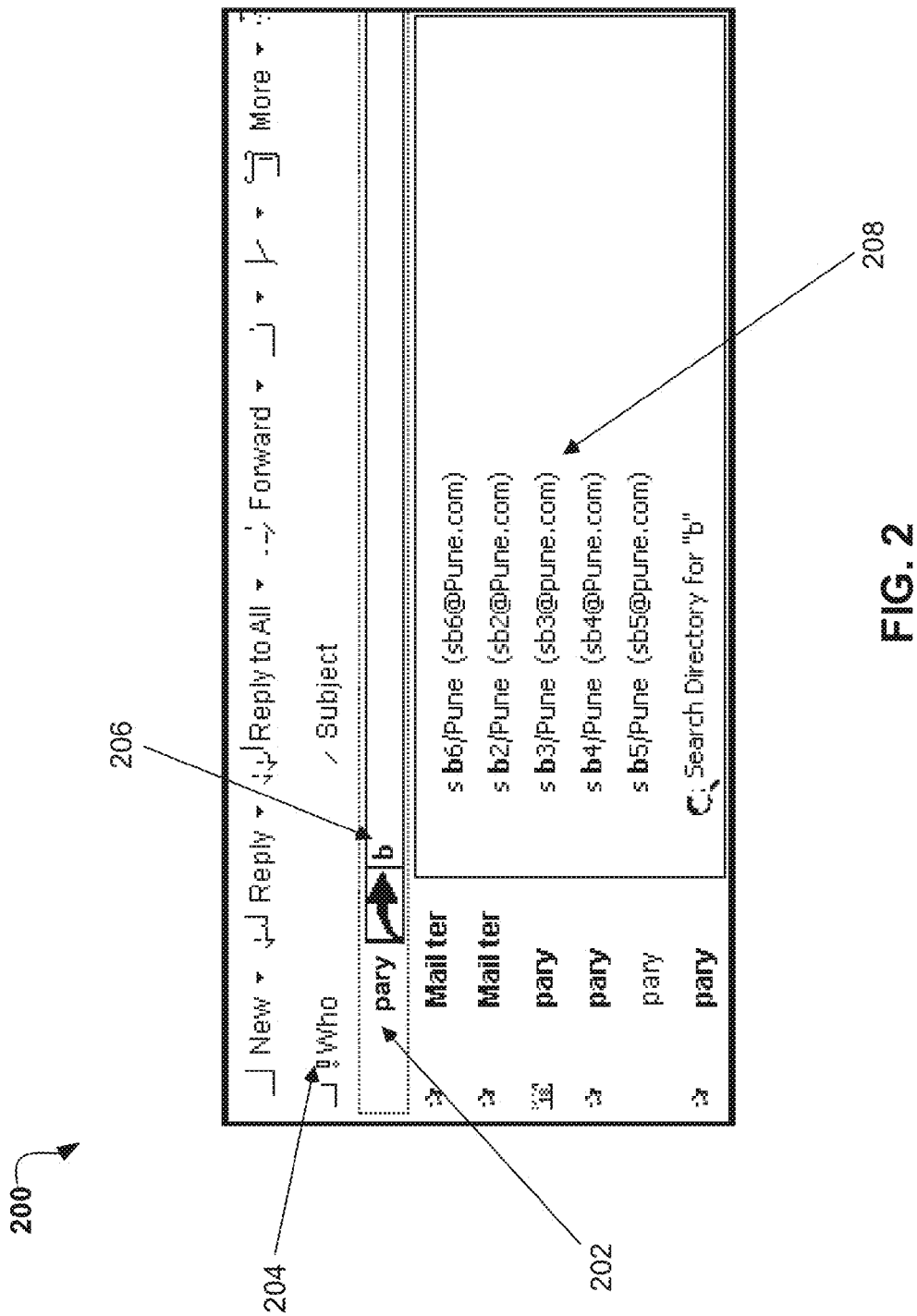
FIG. 2 is an example of an activated user interface display field associated with an email view context of an email application according to one embodiment.

Referring now to FIG. 2, an example of an activated user interface display field 202 associated with an email view context 200 of an email application according to one embodiment is depicted. As previously described in FIG. 1, the user interface active field program 108A, 108B (FIG. 1) may enable users to perform actions using user interface display fields based on the context associated with the user interface display fields. For example, an email application may include an email view context 200 whereby users may view received emails, and whereby the received emails may include user interface display fields such as the sender name, the subject, and the date and time of the received emails (not shown). Furthermore, the user interface active field program 108A, 108B (FIG. 1) may enable users to perform actions such as forwarding received emails to users while maintaining the email view context 200.

Specifically, using the email view context 200, the user interface active field program 108A, 108B (FIG. 1) may enable users to forward received emails using activated user interface display fields 202. More specifically, the user interface active field program 108A, 108B (FIG. 1) may enable users to forward emails by receiving a user action on a user interface display field that is associated with a received email, such as a sender's name in the "who" column 204 of the email view context 200. For example, the user interface active field program 108A, 108B (FIG. 1) may receive a user action, such as a user using a mouse to hover over the name of the sender of an email, to thereby activate the user interface display field. Thereafter, the user interface active field program 108A, 108B (FIG. 1) may present users with a typing widget 206 associated with the activated user interface display field 202 to enable users to type the names of the recipients of the forwarded email. Furthermore, the user interface active field program 108A, 108B (FIG. 1) may present a drop down list of names 208 matching the recipient names typed in by the user, and may enable users to select the recipients' names and press "enter" to forward the email.

Figure 3:
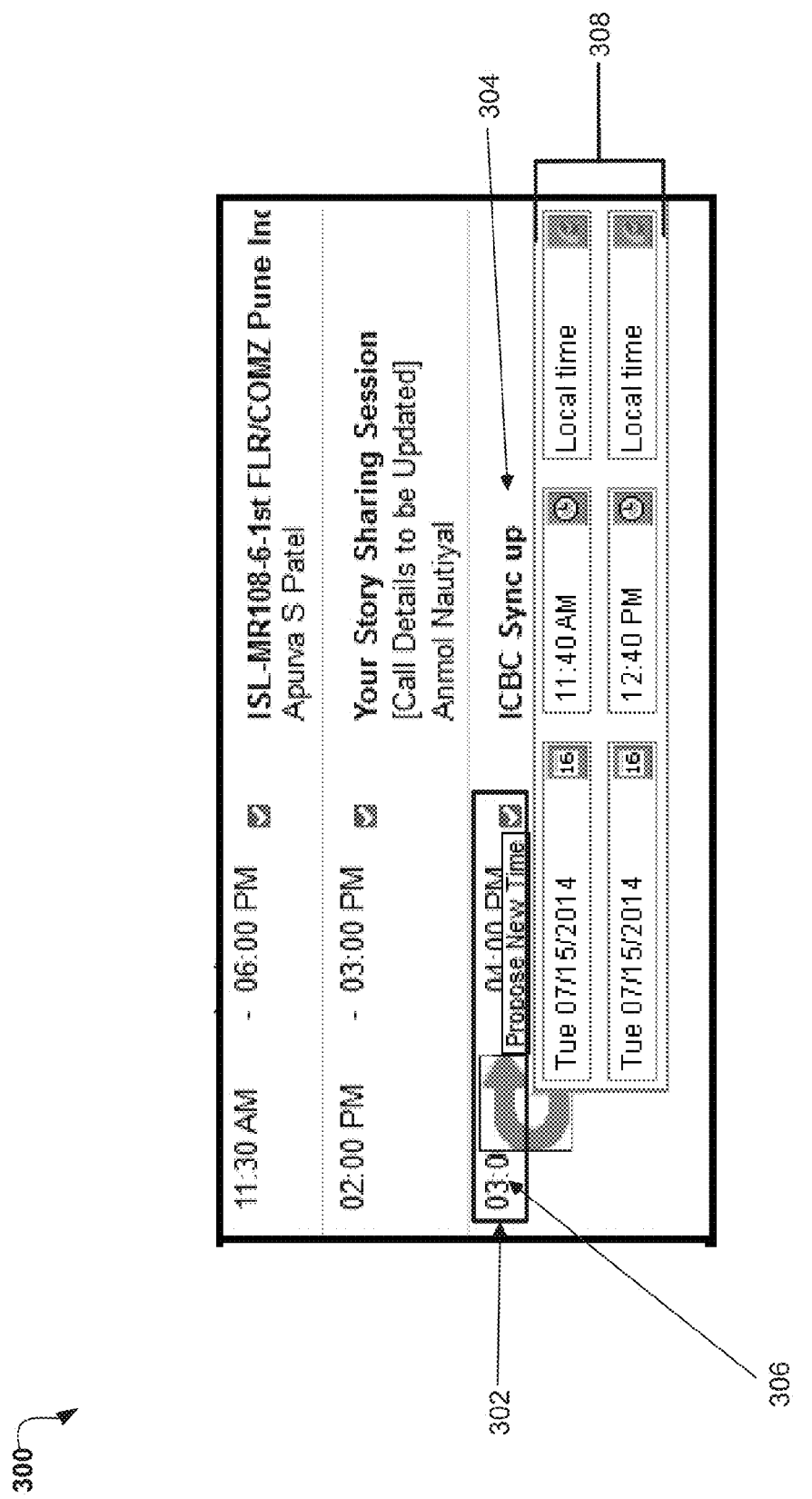
FIG. 3 is an example of an activated user interface display field associated with a calendar view context of an email application.

Referring now to FIG. 3, an example of an activated user interface display field 302 associated with a calendar view context 300 of an email application is depicted. As previously described in FIGS. 1 and 2, the user interface active field program 108A, 108B (FIG. 1) may enable users to perform actions using user interface display fields based on the context associated with the user interface display fields. For example, an email application may include a calendar view context 300 whereby users may view scheduled meetings 304, and whereby the scheduled meetings may include user interface display fields such as the meeting description, and the date and time 306 of the scheduled meeting 304. Furthermore, the user interface active field program 108A, 108B (FIG. 1) may enable users to perform actions such as edit the date and time 306 of scheduled meetings 304 while maintaining the calendar view context 300.

Specifically, the user interface active field program 108A, 108B (FIG. 1) may enable users to edit the date and time 306 of the scheduled meetings 304 using the activated user interface display field 302. More specifically, the user interface active field program 108A, 108B (FIG. 1) may enable users to edit the date and time 306 of the scheduled meetings 304 by receiving a user action on a user interface display field, such as a the date and time 306 that is associated with a scheduled meeting in the calendar view context 300. For example, the user interface active field program 108A, 108B (FIG. 1) may receive a user action, such as a user using a mouse to hover over the date and time 306 of a scheduled meeting 304, to thereby activate the user interface display field 302. Thereafter, the user interface active field program 108A, 108B (FIG. 1) may present users with a propose new time widget 308 associated with the activated user interface display field 302 to enable users to edit the date and time 306 of the scheduled meeting 304.

Figure 4:
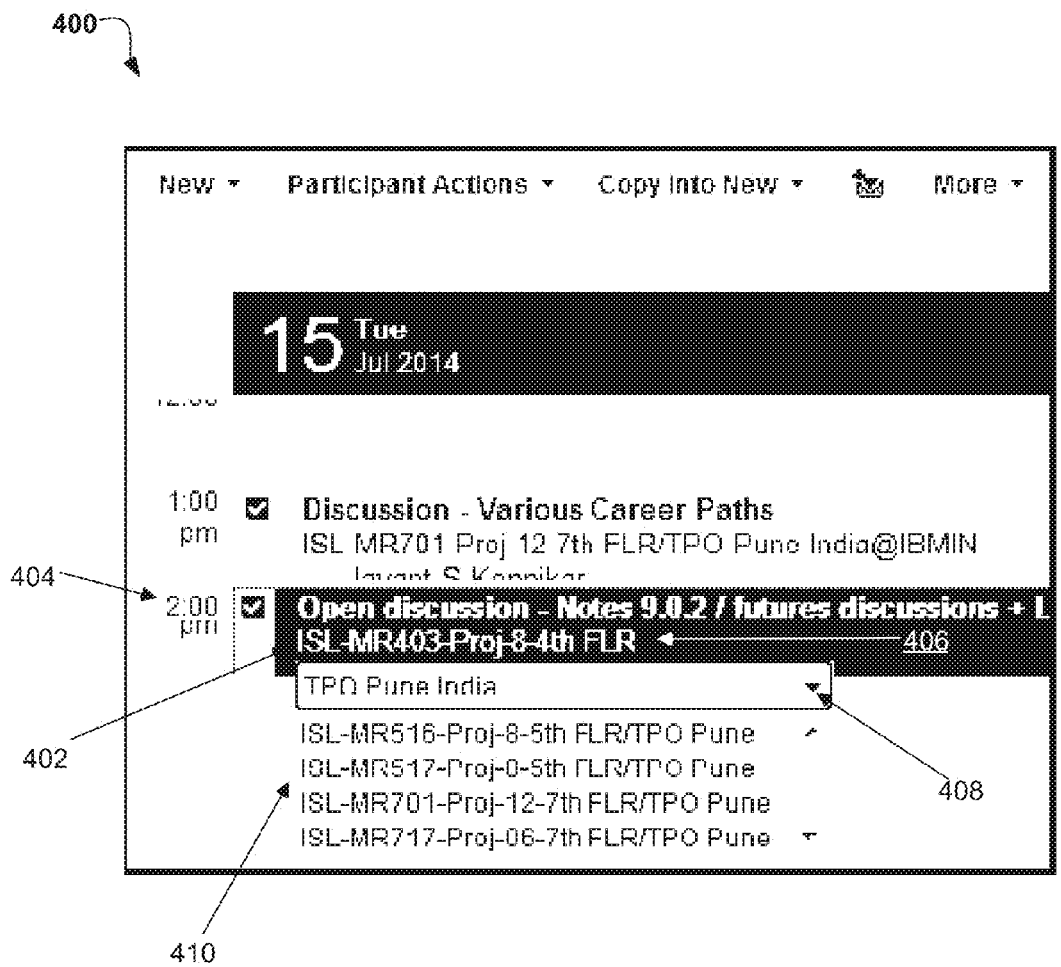
FIG. 4 is an example of an activated user interface display field associated with a calendar view context of an email application.

Similarly, in FIG. 4, users may edit the location 406 of the scheduled meetings 404 while maintaining the calendar view context 400. Specifically, the user interface active field program 108A, 108B (FIG. 1) may enable users to edit the location 406 of the scheduled meetings 404 by receiving a user action on a user interface display field, such as a the location field 406 that is associated with a scheduled meeting in the calendar view context 400. For example, the user interface active field program 108A, 108B (FIG. 1) may receive a user action, such as a user using a mouse to hover over the location 406 of a scheduled meeting 404, to thereby activate the user interface display field 402. Thereafter, the user interface active field program 108A, 108B (FIG. 1) may present users with a location change widget 408 associated with the activated user interface display field 402 to enable users to edit the location 406 of the scheduled meeting 404. Furthermore, the user interface active field program 108A, 108B (FIG. 1) may present a drop down list of locations 410, and may enable users to select a location and press "enter" to edit the location 406 of scheduled meeting 404.

Figure 5:
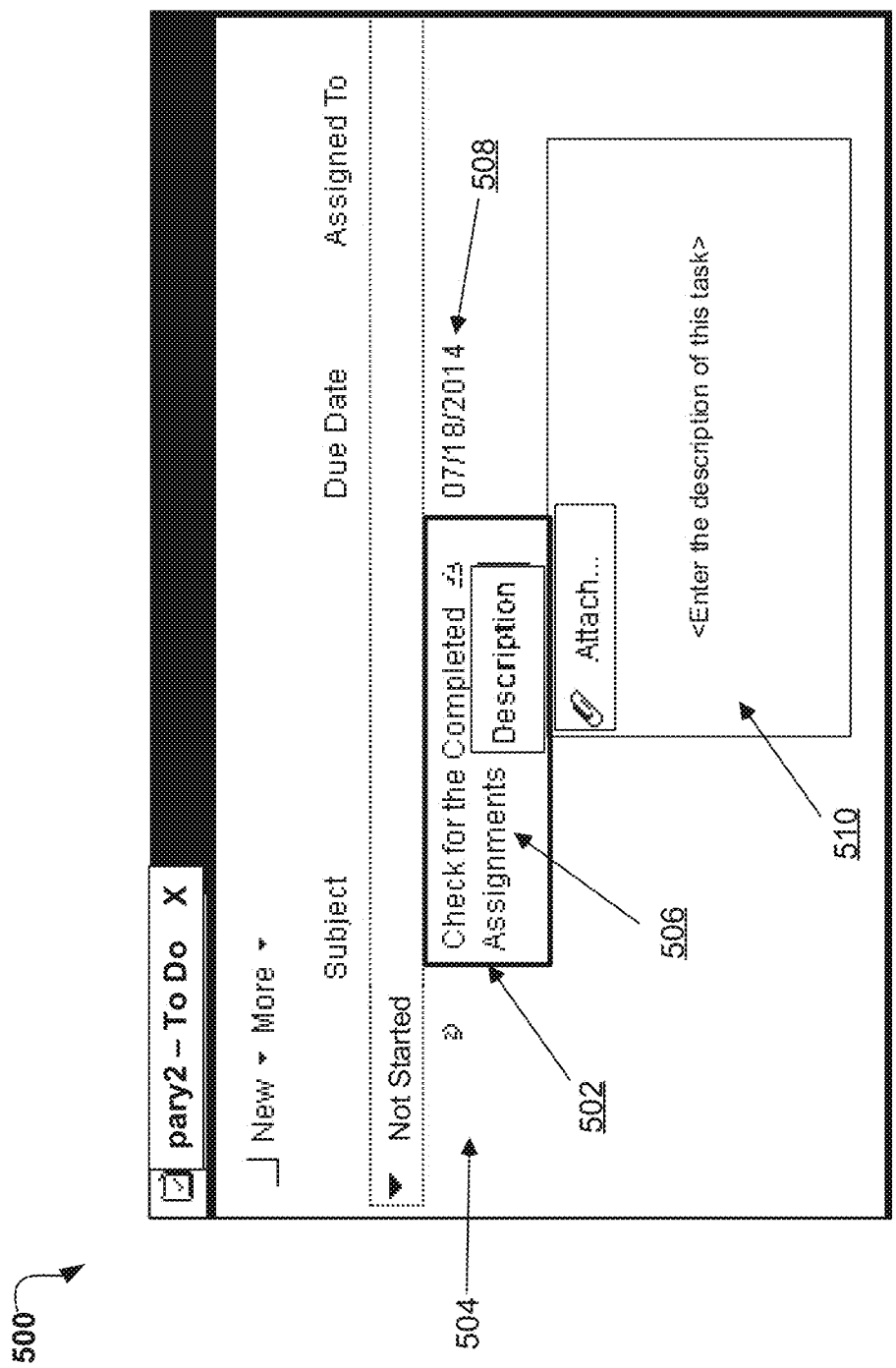
FIG. 5 is an example of an activated user interface display field associated with a "to do" view context of an email application.

Referring now to FIG. 5, an example of an activated user interface display field 502 associated with a "to do" view context 500 of an email application is depicted. As previously described in FIGS. 2-4, the user interface active field program 108A, 108B (FIG. 1) may enable users to perform actions using user interface display fields based on the context associated with the user interface display fields. For example, an email application may include a "to do" view context 500, whereby users may view "to do" entries 504, and whereby the "to do" entries may include user interface display fields such as the "to do" description 506, and the due date 508 of the "to do" entries 504. Furthermore, the user interface active field program 108A, 108B (FIG. 1) may enable users to perform actions such as editing the "to do" description 506 of the "to do" entries 504 while maintaining the "to do" view context 500.

Specifically, the user interface active field program 108A, 108B (FIG. 1) may enable users to edit the "to do" subject/description 506 of the "to do" entries 504 using the activated user interface display field 502. More specifically, the user interface active field program 108A, 108B (FIG. 1) may enable users to edit the "to do" subject/description 506 of the "to do" entries 504 by receiving a user action on a user interface display field that is associated with a "to do" entry 504 in the "to do" view context 500. For example, the user interface active field program 108A, 108B (FIG. 1) may receive a user action, such as a user using a mouse to hover over the "to do" subject/description 506 of a "to do" entry 504, to thereby activate the user interface display field 502. Thereafter, the user interface active field program 108A, 108B (FIG. 1) may present users with an edit description widget 510 associated with the activated user interface display field 502 to enable users to edit the "to do" subject/description 506 of the "to do" entry 504.

Figure 6:
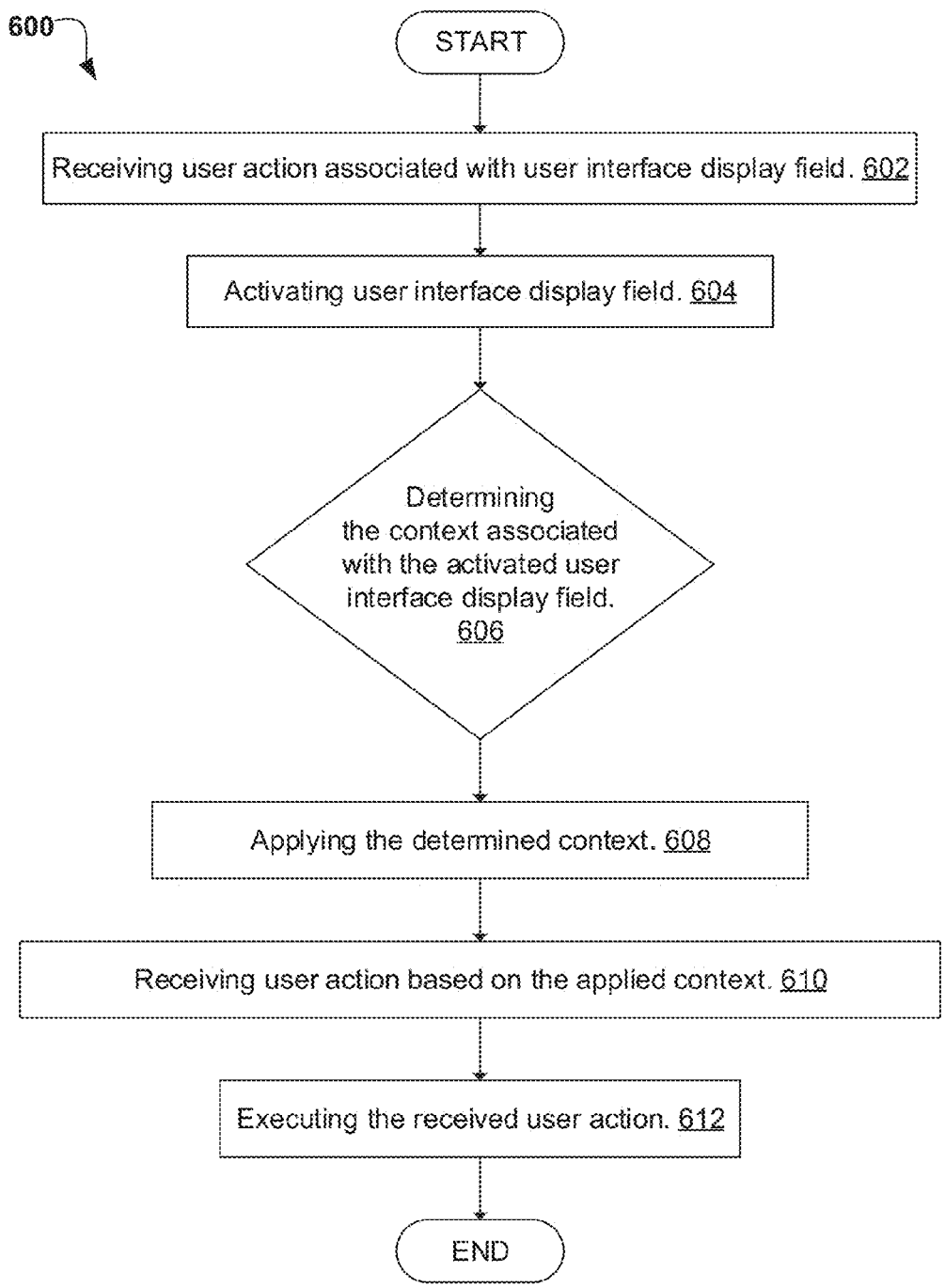
FIG. 6 is an operational flowchart illustrating the steps carried out by a program for enabling at least one user interface display field to perform at least one action according to one embodiment.

Referring now to FIG. 6, an operational flowchart 600 illustrating the steps carried out by a program for enabling user interface display fields to perform actions based on user interaction is depicted. At 602, the user interface active field program 108A, 108B (FIG. 1) may receive a user action associated with a user interface display field. As previously described in FIGS. 2-5, the user interface active field program 108A, 108B (FIG. 1) may enable users to perform actions such as forwarding emails (FIG. 2), editing the date and time 306 (FIG. 3) of scheduled meetings 304 (FIG. 3), editing the location 406 (FIG. 4) of scheduled meetings 404 (FIG. 4), and editing the "to do" subject/description 506 of "to do" entries 504 by receiving a user action on a user interface display field. For example, the user interface active field program 108A, 108B (FIG. 1) may receive a user action, such as a user using a mouse to hover over the name of the sender of an email to forward the email.

Next, at 604, the user interface active field program 108A, 108B (FIG. 1) may activate the user interface display field. As previously described at step 602, the user interface active field program 108A, 108B (FIG. 1) may receive a user action such as a user using a mouse to hover over a user interface display field. Therefore, based on the received user action, the user interface active field program 108A, 108B (FIG. 1) may activate the user interface display field. As such, and as previously described in FIGS. 2-5, the activated user interface display fields 202 (FIG. 2), 302 (FIG. 3), 402 (FIG. 4), and 502 (FIG. 5) may be used to perform actions such as editing the content associated with the user interface display fields based on the context of the activated user interface display.

Then, at 606, the user interface active field program 108A, 108B (FIG. 1) may determine the context associated with the activated user interface display fields 202 (FIG. 2), 302 (FIG. 3), 402 (FIG. 4), and 502 (FIG. 5). As previously described in FIGS. 2-5, the user interface active field program 108A, 108B (FIG. 1) may enable users to perform actions based on the context associated with the user interface display field, and the context may include an email view context 200 (FIG. 2), a calendar context view 300, 400 (FIGS. 3 and 4), and a "to do" view context 500 (FIG. 5). For example, an email context view 200 (FIG. 2) and a calendar view context 300, 400 (FIGS. 3 and 4) may both include a user interface display field such as a person field, whereby the person field in the email view context 200 (FIG. 2) may be the sender/recipient, and the person field in the calendar view context 300, 400 (FIGS. 3 and 4) may be the chair/invitee. Thus, according to one implementation, the user interface active field program 108A, 108B (FIG. 1) may activate a user interface display field, such as a person field, and determine whether the activated user interface display field is associated with an email view context 200 (FIG. 2) or a calendar view context 300, 400 (FIGS. 3 and 4). As such, the user interface active field program 108A, 108B (FIG. 1) may determine the context associated with the activated user interface display fields 202 (FIG. 2), 302 (FIG. 3), 402 (FIG. 4), and 502 (FIG. 5) to enable users to perform the actions that are associated with the user interface display fields.

Next, at 608, the user interface active field program 108A, 108B (FIG. 1) may apply the determined context. As previously described at step 606, the user interface active field program 108A, 108B (FIG. 1) may determine the context associated with the activated user interface display fields 202 (FIG. 2), 302 (FIG. 3), 402 (FIG. 4), and 502 (FIG. 5). Thereafter, the user interface active field program 108A, 108B (FIG. 1) may apply the determined context associated with the activated user interface display fields 202 (FIG. 2), 302 (FIG. 3), 402 (FIG. 4), and 502 (FIG. 5). For example, and as previously described at step 606, the activated user interface display field 202 (FIG. 2) associated with the person field in the email view context 200 (FIG. 2) may perform different actions compared to the person field associated with the calendar view context 300, 400 (FIGS. 3 and 4). Specifically, the user interface active field program 108A, 108B (FIG. 1) may determine that the activated user interface display 202 (FIG. 2) associated with the person field applies to an email view context 200 (FIG. 2) and may present a type widget 206 (FIG. 2) to enable users to perform such actions as forwarding emails, whereas the user interface active field program 108A, 108B (FIG. 1) may determine that the activated user interface display 302, 402 (FIGS. 3 and 4) associated with the person field applies to a calendar view context 300, 400 (FIGS. 3 and 4) and may present a type widget to perform such actions as editing the invitees to scheduled meetings 304, 404 (FIGS. 3 and 4).

Then, at 610, the user interface active field program 108A, 108B (FIG. 1) may receive user actions based on the applied context. As previously described at step 608, the user interface active field program 108A, 108B (FIG. 1) may apply the determined context associated with the activated user interface display fields 202 (FIG. 2), 302 (FIG. 3), 402 (FIG. 4), and 502 (FIG. 5). For example, and as previously described in FIG. 2, the user interface active field program 108A, 108B (FIG. 1) may determine that the activated user interface display 202 (FIG. 2) associated with the person field applies to an email view context 200 (FIG. 2) for forwarding emails and may present a type widget 206 (FIG. 2). Therefore, the user interface active field program 108A, 108B (FIG. 1) may receive a user action such as a user typing the names of the recipients of an email to forward. Furthermore, the user interface active field program 108A, 108B (FIG. 1) may present a drop down list of names 208 (FIG. 2) matching the recipient names typed in by the user, and may enable users to select the recipients' names and press "enter" to forward the email.

Next, at 612, the user interface active field program 108A, 108B (FIG. 1) may execute the received user action. As previously described in FIGS. 2-5, the user interface active field program 108A, 108B (FIG. 1) may enable users to perform actions such as forwarding emails (FIG. 2), editing the date and time 306 (FIG. 3) of scheduled meetings 304 (FIG. 3), editing the location 406 (FIG. 4) of scheduled meetings 404 (FIG. 4), and editing the "to do" subject/description 506 (FIG. 5) of "to do" entries 504 (FIG. 5) by receiving a user action on a user interface display field. For example, in the calendar view context 300 (FIG. 3), the user interface active field program 108A, 108B (FIG. 1) may receive a user action on the propose new time widget 308 (FIG. 3) associated with the activated user interface display field 302 (FIG. 3) of a scheduled meeting 304 (FIG. 3). Specifically, the user interface active field program 108A, 108B (FIG. 1) may receive a user action such as a user selecting a different time and/or date, and may execute the user action by applying the new date and time selections made by the user to the scheduled meeting 304 (FIG. 3).

It may be appreciated that FIGS. 2-6 provide only illustrations of one implementation and does not imply any limitations with regard to how different embodiments may be implemented. Many modifications to the depicted environments may be made based on design and implementation requirements.

Figure 7:
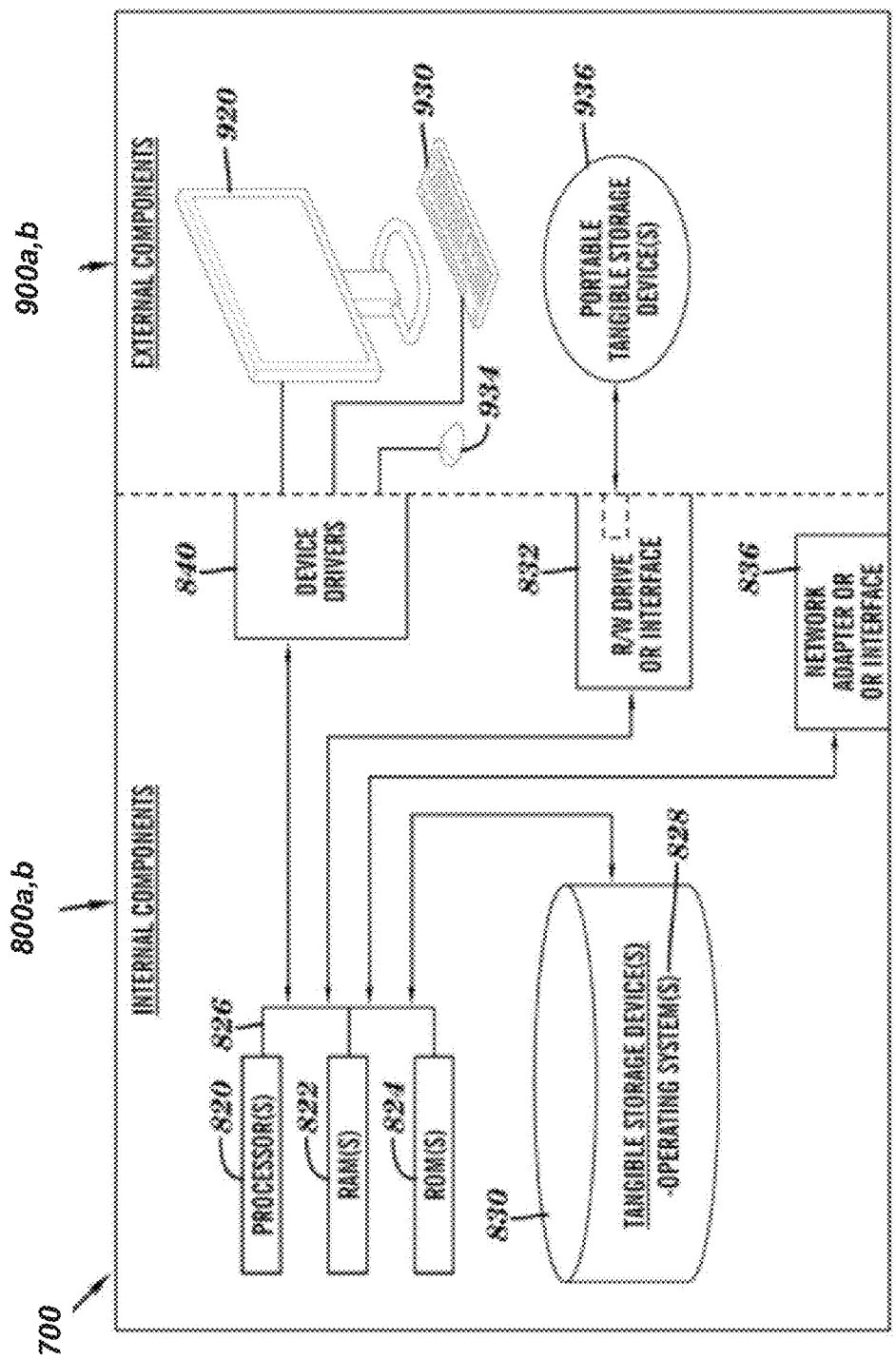
FIG. 7 is a block diagram of the system architecture of a program for enabling at least one user interface display field to perform at least one action according to one embodiment.

FIG. 7 is a block diagram 700 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 7. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the software program 114 (FIG. 1), the user interface active field program 108A (FIG. 1) in client computer 102 (FIG. 1), and the user interface active field program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a user interface active field program 108A and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The user interface active field program 108A (FIG. 1) and software program 114 (FIG. 1) in client computer 102 (FIG. 1), and the user interface active field program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the user interface active field program 108A (FIG. 1) and software program 114 (FIG. 1) in client computer 102 (FIG. 1) and the user interface active field program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
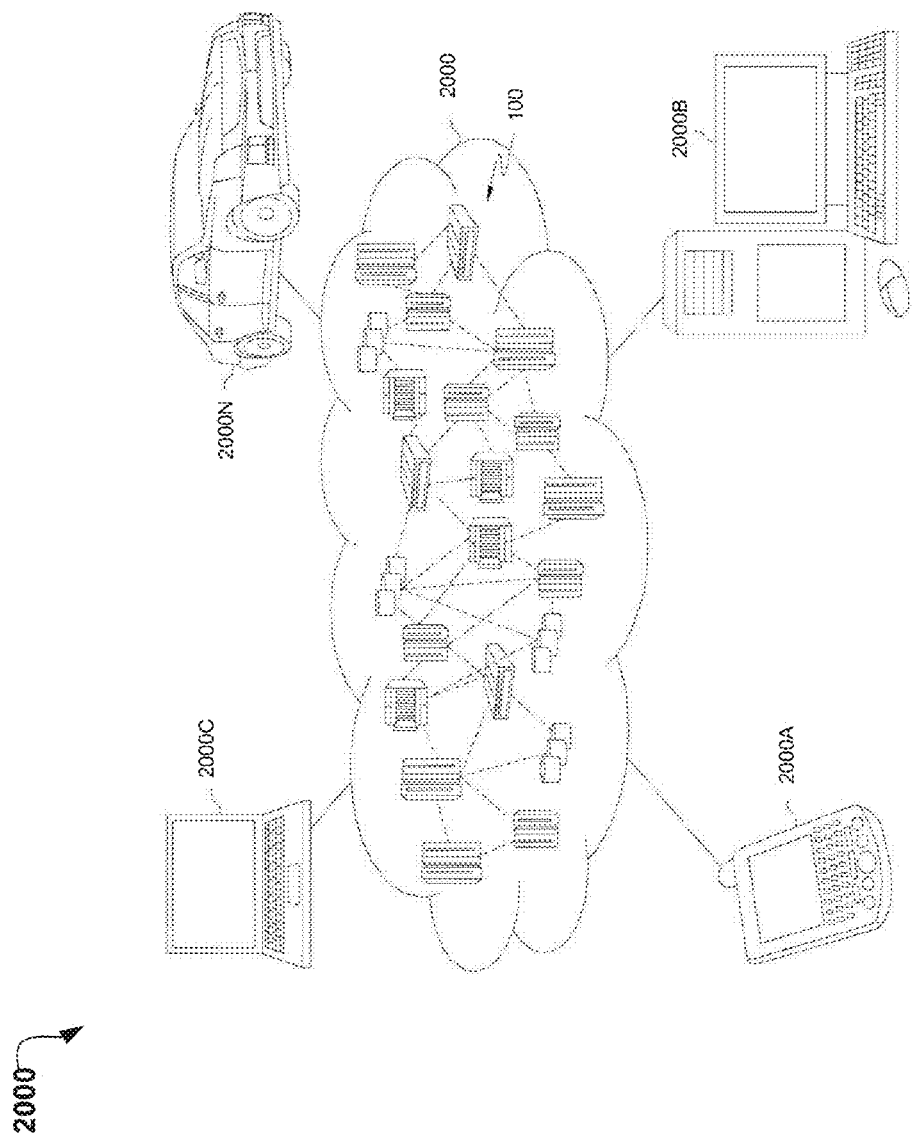
FIG. 8 is a block diagram of an illustrative cloud computing environment including the computer system depicted in FIG. 1, in accordance with an embodiment of the present disclosure.

Referring now to FIG. 8, illustrative cloud computing environment 2000 is depicted. As shown, cloud computing environment 2000 comprises one or more cloud computing nodes 100 with which local computing devices used by cloud consumers, such as, for example, personal digital assistant (PDA) or cellular telephone 2000A, desktop computer 2000B, laptop computer 2000C, and/or automobile computer system 2000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 2000 to offer infrastructure, platforms and/or software as services for which a cloud consumer does not need to maintain resources on a local computing device. It is understood that the types of computing devices 2000A-N shown in FIG. 8 are intended to be illustrative only and that computing nodes 100 and cloud computing environment 2000 can communicate with any type of computerized device over any type of network and/or network addressable connection (e.g., using a web browser).

Figure 9:
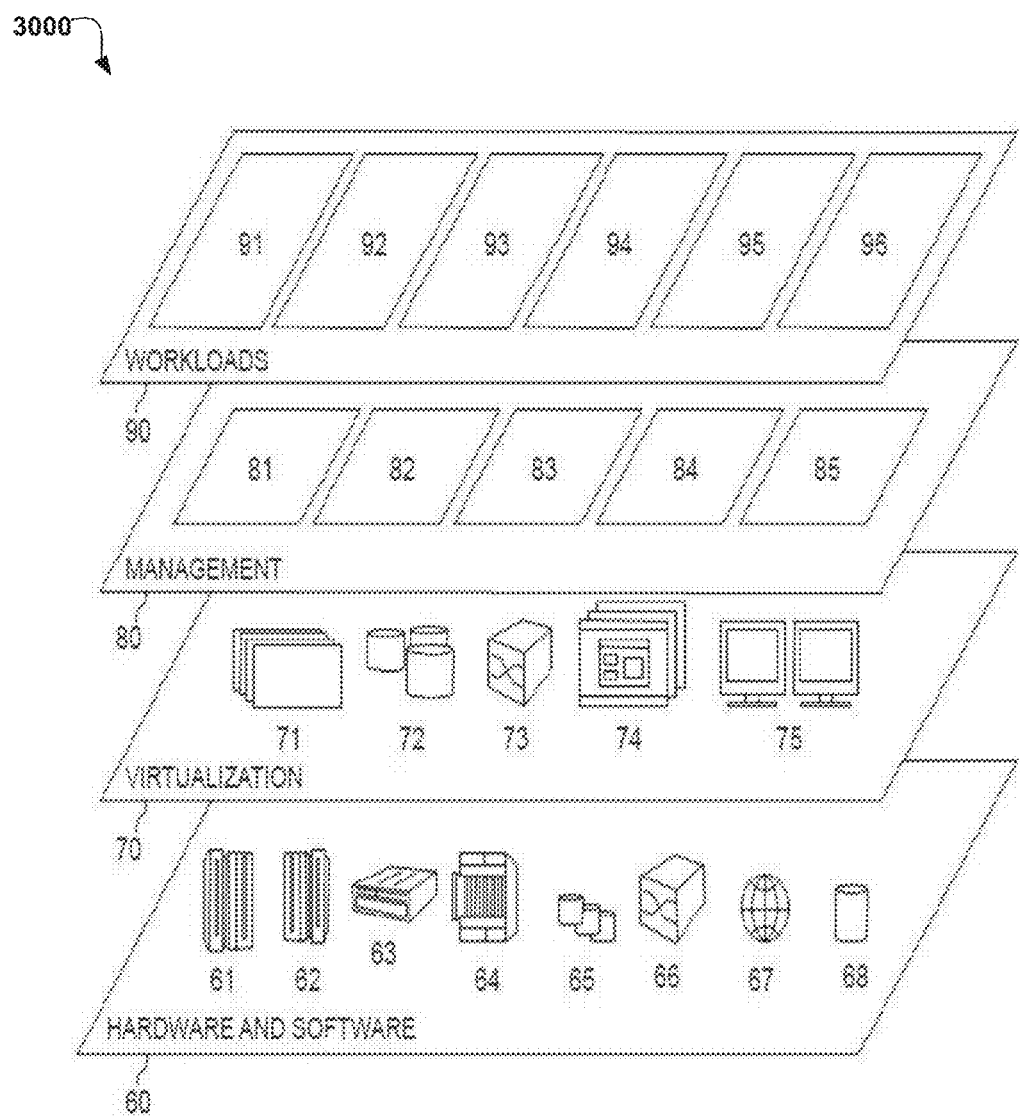
FIG. 9 is a block diagram of functional layers of the illustrative cloud computing environment of FIG. 8, in accordance with an embodiment of the present disclosure.

Referring now to FIG. 9, a set of functional abstraction layers 3000 provided by cloud computing environment 2000 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and User Interface Active Field 96. A User Interface Active Field Program 108A, 108B (FIG. 1) may be offered "as a service in the cloud" (i.e., Software as a Service (SaaS)) for applications running on mobile devices 102 (FIG. 1) and may provide user interface display fields that perform different actions based on user interaction.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enabling at least one user interface display field to perform at least one action, the method comprising:

receiving a first user action associated with the at least one user interface display field, wherein the at least one user interface display field is selected from a group comprising at least one name in a who column of an email application person header, at least one description in a description column of an email application subject description header, and at least one date and time in a date and time column of an email application date and time header, and wherein receiving the first user action comprises receiving a user using a pointing device to hover over the at least one user interface display;

activating the at least one user interface display field in response to the pointing device hovering over the at least one user interface display;

determining a context associated with the activated at least one user interface display field, wherein the context comprises at least one of an email view context, a calendar view context, and a to do list view context;

applying the determined context associated with the activated at least one user interface display, wherein applying the determined context comprises presenting at least one of a typing widget, a propose new time widget, a location change widget, and an edit description widget;

maintaining the determined context associated with the activated at least one user interface display while presenting at least one of the typing widget, the propose new time widget, the location change widget, and the edit description widget;

receiving a second user action associated with the activated at least one user interface display field based on the applied determined context, wherein receiving the second user action further comprises receiving at least one of at least one typed named using the typing widget to send an email to the at least one typed name and to schedule a meeting with the at least one typed name, at least one selected date and time using the propose new time widget to schedule a new date and a new time for a scheduled meeting, at least one typed location using the location change widget to select a new location for the scheduled meeting, and a typed description using the edit description widget to change a description of a scheduled meeting and to change a description of a to do list;

wherein in response to receiving the at least one typed named associated with the typing widget, presenting a drop down list of a plurality of matching names;

wherein in response to receiving the at least one typed location associated with the location change widget, presenting a drop down list of a plurality of matching locations; and executing the received second user action, wherein executing the received second user action comprises at least one of selecting a name associated with the at least one typed name to send an email to the selected name, selecting a name associated with the at least one typed name to schedule a meeting with the selected name, selecting a date and time using the propose new time widget to schedule the new date and the new time for the scheduled meeting, changing the description of the scheduled meeting, and changing the description of the to do list.

* * * * *